United States Patent [19]

Adachi et al.

[11] Patent Number: 4,919,474
[45] Date of Patent: Apr. 24, 1990

[54] AUTOMOBILE FRONT BODY STRUCTURE

[75] Inventors: Ryoichi Adachi; Shyuji Muraoka, both of Hiroshima, Japan

[73] Assignee: Mazda Motor Corporation, Hiroshima, Japan

[21] Appl. No.: 343,598

[22] Filed: Apr. 27, 1989

[30] Foreign Application Priority Data

Apr. 27, 1988 [JP] Japan .................. 63-106021

[51] Int. Cl.5 ............................................. B62D 25/08
[52] U.S. Cl. ................... 296/194; 296/198; 296/188
[58] Field of Search .............. 296/194, 198, 188; 280/153 A

[56] References Cited

U.S. PATENT DOCUMENTS

| 4,408,794 | 10/1983 | Harasaki | 296/198 |
| 4,429,914 | 2/1984 | Bez et al. | 296/188 |
| 4,542,934 | 9/1985 | Komatsu et al. | 296/194 |
| 4,560,198 | 12/1985 | Katano et al. | 296/194 |
| 4,687,217 | 8/1987 | Stewart | 296/198 |

FOREIGN PATENT DOCUMENTS 57-37081  8/1980  Japan .

Primary Examiner—Robert R. Song
Attorney, Agent, or Firm—Fleit, Jacobson, Cohn, Price, Holman & Stern

[57] ABSTRACT

A front body structure for an automobile body having a front wheel apron constituting a side wall of an engine room and supporting a suspension comprises a front frame extending in a lengthwise direction of the front body and connected to a lower portion of the front wheel apron. The front wheel apron is provided with side extension laterially overhanging therefrom and extending in the lengthwise direction between which an intermediate space is formed. A stiffener is disposed in the intermediate space and secured to the side extensions and has a rigidity higher than the front wheel apron. The front wheel apron is accompanied with a reinforcement which extends a the lengthwise direction of the front body over the upper portion of the front wheel apron and is connected to the side extension and the stiffener to form a closed cross-section in cooperation therewith.

6 Claims, 3 Drawing Sheets

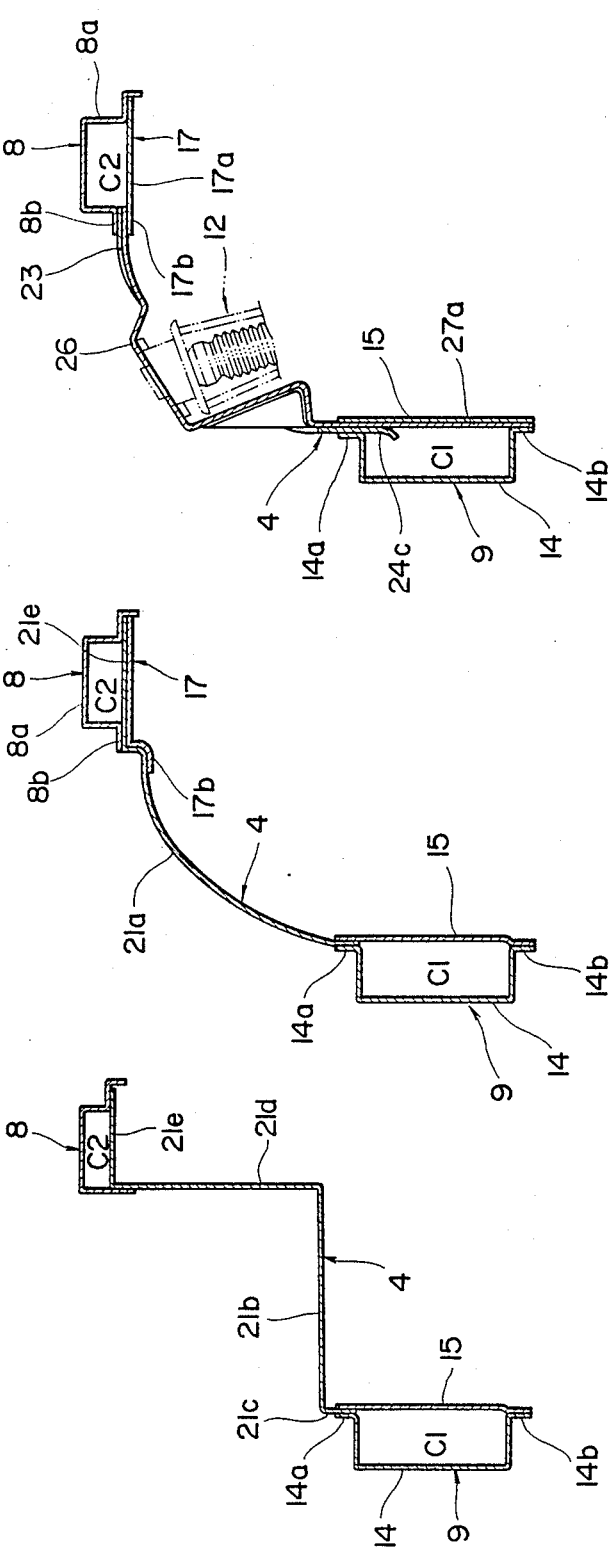

AUTOMOBILE FRONT BODY STRUCTURE

FIELD OF THE INVENTION

The present invention relates to the front body structure of an automobile body.

BACKGROUND OF THE INVENTION

An automobile body comprises a front body section, a central body section and a rear body section. The front body section includes an engine compartment or room. Such a front body section has a side wall structure generally comprising part of front wheel apron, reinforcement members attached to upper and lower sides of the front wheel apron and a front frame. Although the front body should be resistant to read shock when the automobile is traveling, it should nevertheless be able to be crashed or collapsed in order to absorb impact energy to avoid deforming the central body section, which constitutes a passenger compartment upon a car crash.

To make the front body easily collapsible, it was taught that a front wheel apron should be stiffened by way of a reinforcement member consisting of a front reinforcement segment easy to collapse and rear reinforcememt segment having a structural strength or rigidity higher than the front reinforcement segment. When the vehicle crashes head on another vehicle or smashes into a solid construction, the front reinforcement part receives a frontal impact force imparted onto the car body, and in particular to the front of the car body, and causes therein a collapse so that the front of the car body a buckling, or is crushed short, thereby short, thereby absorbing the frontal impact force so as to prevent a driver's compartment from being subjected to considerable shock or damage. Such a front body structure is known from Japanese Unexamined Utility Model Publication No. 57-37,081. However, the provision of such a front wheel reinforcement with a rear reinforcement segment improved in structural strength or rigidity results in a heavy front body, and hence a heavy car body.

To obtain low drag coefficiency ($C_D$), a recent tendency in car body design is to construct a front body having a low hood or bonnet. Such a car body with a low hood type front body is improved by means of utilizing a double wish-bone type suspension. When the double wish-bone type suspension is used, it is often necessary to support the suspension by a front wheel apron. In this respect, it is necessary that the wheel apron, and in particular the part thereof where the suspension is supported, be designed not only to have a high structural strength or rigidity but also to effectively distribute road shock imparted from the suspension.

SUMMARY OF THE INVENTION

It is, therefore, a primary object of the present invention to provide a car body having a novel front body which has a stiffened part where a suspension is supported.

It is another object of the present invention to provide a car body having a novel front body which can take advantage of effective distribution of road shock imparted from a suspension.

The objects of the present invention all achieved by a front body structure for an automobile body having a front wheel apron constituting a side wall of an engine room and supporting a suspension. The front body comprises front frame means extending in a lengthwise direction of the front body and connected to a lower portion of the front wheel apron. The front wheel apron is provided with side extension means laterally overhanging from an upper portion thereof and extending in the lengthwise direction, the side extension being formed therein with an intermediate space adjacent to a portion of the front wheel apron where a suspension assembly is supported. Stiffener means is disposed in the intermediate space of the side extension means and secured to the side extension means and has a rigidity higher than the front wheel apron. The front wheel apron is accompanied with reinforcement means which extends in a lengthwise direction of the front body over the upper portion of the front wheel apron and is connected to the side extension means and the stiffener member to form a closed cross-section in cooperation therewith.

BRIEF DESCRIPTION OF THE DRAWINGS

The above and other objects and features of the present invention will be apparent from the following description of the preferred embodiment taken with reference to the accompanying drawings in which:

FIG. 3 is a cross-sectional view of FIG. 1 taken along line III—III;

FIG. 4 is a cross-sectional view of FIG. 1 taken along line IV—IV; and

FIG. 5 is a cross-sectional view of FIG. 1 taken along line V—V.

DETAILED DESCRIPTION OF PREFERRED EMBODIMENT

Because in general automobile body itself is well known, the present description will be directed in particular to elements forming parts of, or cooperating with, the novel construction of the front body section in accordance with the present invention. It is to be understood that elements not specifically shown or described can take various forms well known to those skilled in the art.

It should be noted that the words "front" and "rear" in this specification indicate directions toward the forward end and back end of an automobile body, respectively, and the word "lengthwise" means a direction extending from the front to the rear.

Figure 1:
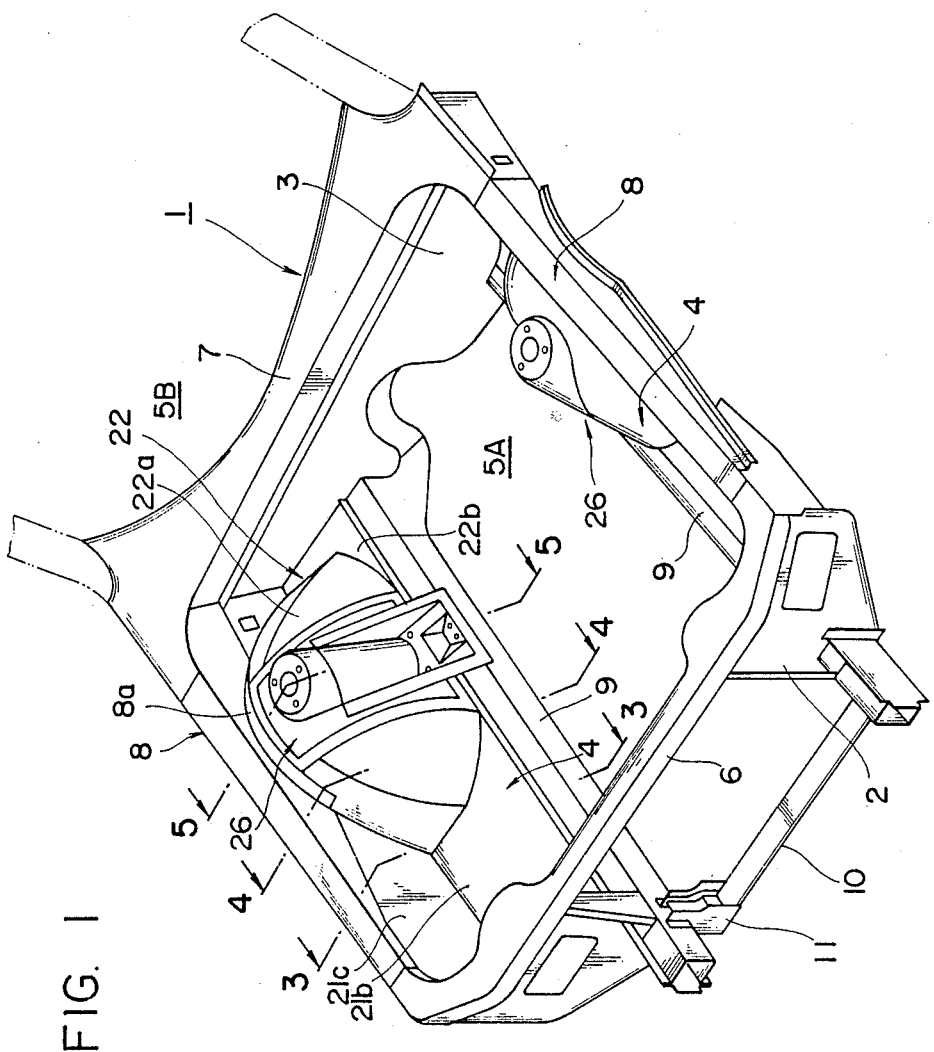
FIG. 1 is a fragmentary perspective view illustrating front portion of a car body according to the present invention.
Figure 2:
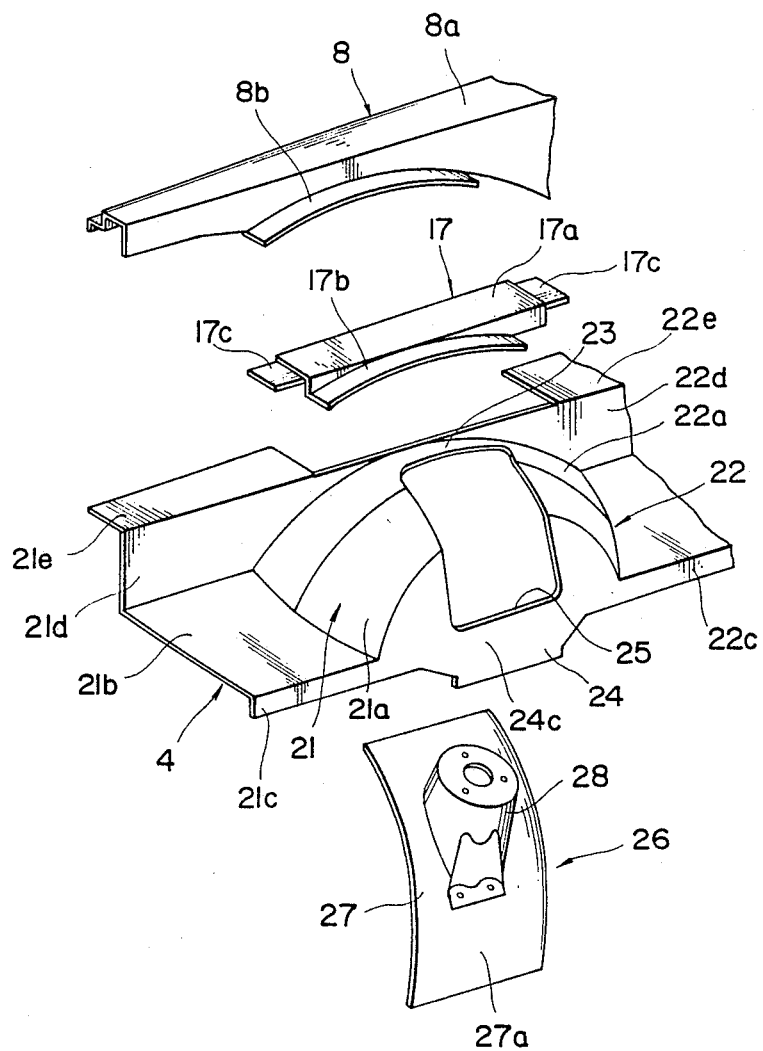
FIG. 2 is an exploded perspective view showing the left side part of the front body portion shown in FIG. 1.

Referring to the drawings, particularly to FIGS. 1 and 2, a front body section 1 of a car body is shown, and includes an engine room or compartment 5A in which an engine and its associated elements are installed. The front body section 1 consists of left and right wheel aprons 4 forming parts of left and right side walls of the engine room 5A, a dash panel 3 as a partition wall separating the engine room and a driver's compartment or passenger room 5B and left and right front shroud panels 2. These shroud panels 2 are interconnected with an upper shroud 6 in a well known manner, such as spot welding or soldering. A cowl 7 is connected to the upper edge of the dash panel 3. Left reinforcement member 8 extending lengthwise interconnects the left end of the upper shroud 6 and the left front end of the cowl 7. Similarly, right reinforcement member 8, extending in the lengthwise direction, interconnects the right end of the upper shroud 6 and the right end of the cowl 7. The shroud panel 2 and the dash panel 3 are interconnected by way of left and right front frames 9, which in cross section generally have the form of a box-channel. Frames 9 extend in a lengthwise direction from the forward to the rear end of the front body 1, respectively. The left wheel apron 4 is connected along its lower side margin to the left front frame 9 and along its upper side to the left reinforcement member 8 at various points in a well known manner, such as by spot welding or soldering. Similarly, the right wheel apron 4 is connected along its lower side margin to the right front frame 9 and along its upper side to the right reinforcement member 8 at various points in a well known manner, such as by spot welding or soldering. Integral front extensions of the left and right front frames 9 are connected to a first cross member 10 by way of gussets 11 (the left side gusset is hidden from view in FIG. 1). Each front frame 9, as clearly shown in FIGS. 3 to 5, consists of a generally U-shaped channel member with upper and lower flanges 14a and 14b as an inner front frame 14 and an elongated plate member as an outer front frame 15 attached to the upper and lower flanges 14a and 14b, whereby each front frame 9 is made to have a closed cross-section C1.

Referring to FIG. 2, wherein only the right side part of the front body 1 of FIG. 1 is shown in detail, the wheel apron 4, which has a generally quarter spherical structure, is constructed from a front half wheel apron section 21, a rear half wheel apron section 22 and upper and lower side bridge sections 23 and 24, all of which define an opening 25. The front half wheel apron section 21 comprises substantially one eight of a spherical shell 21a, a flat front extension 21b extending forward from the front edge of the spherical shell portion 21a and a side wall 21d. The front extension 21b of the front half wheel apron section 21 is formed with a front lower extension 21c bent down at a right angle, and the side wall 21d of the front half wheel section 21 is formed with a front side extension 21e bent laterally from the top edge of the side wall 21d at a right angel. Similarly, the rear half wheel apron section 22 comprises substantially one eight of a spherical shell 22a, a flat rear extension 22b extending rearward from the rear edge of the spherical shell 22b and a side wall 22d. The rear extension 22b of the rear half wheel apron section 22 is formed with a rear lower extension 22c bent down at a right angle, and the side wall 22d of the front half wheel section 22 is formed with a rear side extension 22e bent laterally from the top edge of the side wall 22d at a right angle. The front and rear side extensions 21e and 22e form a cut-away space therebetween. The lower bridge section 24 is formed with an intermediate lower extension 24c extending downward. These front, intermediate and rear lower extensions 21c, 22c and 24c form an integral straight skirting flange extending from the front end of the front half wheel apron section 21 to the rear end of the rear half wheel apron section 22. The front and rear approximately one eight spherical shells 21a and 22b together form an approximately quarter shell. Each wheel apron 4 is formed as one integral whole by pressing and stamping a metal sheet. A suspension tower 26, which forms a part of the right side wall of the engine room 5A and supports or mounts a front suspension assembly 12, consists of a curved base section 27 and a hollow, substantially cylindrical tower 28.

The suspension tower 26 is also formed as one integral whole by pressing. The base section 27 is connected to the inner surface of the wheel apron 4 at various points in a well known manner, such as, spot welding or soldering, so as to close the opening 25.

The lower extensions 21c, 22c and 24c of the front and rear half wheel apron sections 21 and 22 and the lower bridge section 24, which together form a side flange extending straight from the front end of the front half wheel apron section 21 to the rear end of the rear half wheel apron section 22, are interposed between and soldered or welded to the upper flange 14a of the inner front frame 14 and the outer front frame 15. Lower extreme part 27a of the curved base section 27, which is integrally formed as a lower extension reaching the lower edge of the lower flange 14b of the inner front frame 14, is interposed between the inner and outer front frames 14 and 15. That is, the upper portion of the lower extreme part 27a of the curved base section 27 is soldered or welded to lower extreme part of the lower bridge section 24 soldered to the upper flange 14a of the inner front frame 14, and the inner front frame 15. On the other hand, the lower portion of the lower extreme part 27a of the curved base section 27 is directly soldered or welded to the lower flange 14b of the inner front 14 and the outer front frame 15. The suspension tower 26 results in an improved structural rigidity.

An intermediate side extension member 17 is disposed in the cut-away space to join the front and rear side extensions 21e and 22e of the front and rear half wheel apron sections 21 and 22. That is, the intermediate side extension member 17 consists of an elongated side member 17a and a circular arcuate collar 17b integrally formed with the side member 17a. The circular arcuate collar 17b is shaped to match with a shoulder portion of the spherical shells 21a and 22a. Front and rear end portions of the extension member 17a are connected to the lower surfaces of the front and rear side extensions 21e and 22e. In particular, front and rear thinned sections 17c, integral with the side member 17a, are welded or soldered to under surfaces of the front and rear side extensions 21e and 22e, respectively. The side member 17a has a thickness thicker than that of the front and rear side extensions 21e and 22e, and the upper surface of the side member 17a is even with the upper surfaces of the front and rear side extensions 21e and 22e.

The left reinforcement member 8, which, as was previously described, extends lengthwise between the left end of the upper shroud 6 and the dash panel 3, comprises U-shaped channel member 8a opened downward and a circular arcuate collar 8b integrally formed with the channel member 8a. The circular arcuate collar 8b is shaped to match with the outer periphery of the spherical shells 21a and 22a. The reinforcement member 8 is connected to the front, intermediate and rear side extensions 21e, 17a and 22e at various points in a well known manner, such as spot welding or soldering, so as to form a closed cross-section C2.

The front wheel reinforcement structure for the left and right side walls of the engine room 5A, each consisting of the reinforcement member 8 and the front, intermediate and rear side extensions 21e, 17a, and 22e of the left of right wheel aprons 4 as described above, has a structural rigidity or strength at the intermediate part of the front wheel reinforcement adjacent to the suspension tower 26 higher than at front and rear parts thereof.

If the automobile crashes head on into another automobile or smashes into a solid construction, the automobile body, especially the front body portion, will be subjected to a great frontal impact force. Upon a crash, the front parts of the reinforced wheel aprons which have a relatively low structural rigidity or strength relative to the intermediate part receive a great impact force, which causes a buckling or crushing of the front parts so that the impact force is partly or fully absorbed by the front parts, and the passenger room 5B is insulated from being subjected to such a great impact force and prevented from being damaged.

On the other hand, when the automobile with a front body construction in accordance with the present invention is traveling on a road, road shock received by the front body is ordinarily transmitted to the front wheel aprons 4 through wheels and the suspension assemblies 12. The intermediate part of the front wheel reinforcement structure, which has a high structural rigidity or strength, is mainly subjected to a road shock transmitted from the suspension assembly 12. This prevents the initial adjustment of the suspension assembly 12 installed in the side wall from being spoiled.

The road shock transmitted to the intermediate part of the front wheel apron 4 through the suspension assemblies 12 is also transmitted to the wheel apron reinforcements 8 through the front and rear side extensions 21e and 22e of the front and rear half front wheel apron sections 21 and 22 which are relatively weak in structural rigidity, and thereby distributed over the wheel apron reinforcements 8. By virtue of such an effective distribution of road shock, the front body 1 has an increased structural rigidity against road shock.

Although the present invention has been fully described by way of the preferred embodiment thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A front body structure of an automobile body having a front wheel apron constituting a side wall of an engine room, comprising:
    front frame means extending in a lengthwise direction of said front body structure and connected to a lower portion of said front wheel apron;
    side extension means laterally overhanging from an upper portion of said front wheel apron and extending in said lengthwise direction, said side extension means being formed therein with an intermediate space adjacent to a portion of said front wheel apron where a suspension assembly is supported;
    stiffener means disposed in said space of said side extension means and secured to said side extension means, said stiffener means having a rigidity higher than said wheel apron; and
    reinforcement means extending in a lengthwise direction of said front body structure over said upper portion of said front wheel apron and connected to said side extension means and said stiffener means to form a closed cross-section in cooperation therewith.

2. A front body structure as defined in claim 1, wherein said stiffener means is made of a plate like member having a thickness greater than that of said front wheel apron.

3. A front body structure as defined in claim 1, wherein said reinforcement means is a generally U-shaped channel member.

4. A front body structure as defined in claim 1, wherein said side extension means consists of front and rear flanges laterally bent from front and rear upper portions of said front wheel apron spaced apart from each other in said lengthwise direction to provide said intermediate space therebetween.

5. A front body structure as defined in claim 4, wherein said stiffener means is a plate like member having a thickness greater than these of said front and rear flanges and is disposed to have an upper surface thereof even with upper surfaces of said front and rear flanges.

6. A front body structure as defined in claim 5, wherein said plate like member is integrally formed with front and rear stepped extensions which are secured to under surface of said front and rear flanges.

* * * * *